(12) United States Patent
Gong et al.

(10) Patent No.: US 9,096,737 B2
(45) Date of Patent: Aug. 4, 2015

(54) METHOD FOR PREPARING RESIN COMPOSITIONS CONTAINING NANO SILVER PARTICLES

(71) Applicant: Inktec Co., Ltd., Ansan (KR)

(72) Inventors: Myoung Seon Gong, Seoul (KR); Kwang Choon Chung, Yongin-si (KR); Hyun Nam Cho, Gunpo-si (KR)

(73) Assignee: Inktec Co., Ltd., Ansan-si (KR)

( * ) Notice: Subject to any disclaimer, the term of this patent is extended or adjusted under 35 U.S.C. 154(b) by 0 days.

(21) Appl. No.: 14/032,417

(22) Filed: Sep. 20, 2013

(65) Prior Publication Data

US 2014/0024773 A1    Jan. 23, 2014

Related U.S. Application Data

(63) Continuation of application No. 12/808,489, filed as application No. PCT/KR2008/007323 on Dec. 11, 2008, now abandoned.

(30) Foreign Application Priority Data

Dec. 17, 2007    (KR) .................. 10-2007-0131899

(51) Int. Cl.
*C08K 3/08*    (2006.01)
*C08K 9/04*    (2006.01)

(52) U.S. Cl.
CPC .... *C08K 3/08* (2013.01); *C08K 9/04* (2013.01)

(58) Field of Classification Search
CPC .................................... C08K 3/08; C08K 9/04
USPC .................................................. 252/183.16
See application file for complete search history.

(56) References Cited

U.S. PATENT DOCUMENTS

| 2,473,548 | A | 6/1949 | Smith |
| 4,542,214 | A | 9/1985 | Bechara |
| 6,669,981 | B2 | 12/2003 | Parsons et al. |
| 7,267,828 | B2 | 9/2007 | Parsons et al. |
| 7,691,294 | B2 | 4/2010 | Chung et al. |
| 2005/0124724 | A1 | 6/2005 | Burton et al. |
| 2007/0270545 | A1 | 11/2007 | Kim |
| 2008/0118865 | A1 | 5/2008 | Sasaki et al. |
| 2008/0202575 | A1 | 8/2008 | Ren et al. |
| 2009/0324739 | A1 | 12/2009 | Chung et al. |

FOREIGN PATENT DOCUMENTS

| KR | 20030003203 A | 1/2003 |
| KR | 20030031090 A | 4/2003 |
| KR | 20030049007 A | 6/2003 |
| KR | 1020040015077 A | 2/2004 |
| KR | 1020050047029 A | 5/2005 |
| KR | 1020050079261 A | 8/2005 |
| KR | 1020060090180 A | 8/2006 |
| KR | 1020060097271 A | 9/2006 |
| KR | 1020060108875 A | 10/2006 |
| WO | 2005085339 A1 | 9/2005 |
| WO | 2006093398 A1 | 9/2006 |
| WO | 2007007802 A1 | 1/2007 |
| WO | 2007105912 A1 | 9/2007 |

OTHER PUBLICATIONS

Ciba Specialty Chemicals, Coating Effects Segment, Ciba DAROCUR 1173, Edition 4.9.2001, pp. 1-3.
Ciba Specialty Chemicals, Coating Effects Segment, Ciba IRGACURE 819, Edition 30.8.2001, pp. 1-3.
Karak, Fundamentals of Polymers: Raw Materials to Finish Products, 2.2.4 Initiators for Polymerization, 2009, pp. 37-40.

*Primary Examiner* — Brieann R Fink
(74) *Attorney, Agent, or Firm* — The Webb Law Firm

(57) ABSTRACT

The present invention relates to synthetic resin composition containing nano silver particles, in which a silver complex having a specific structure that allows formation of the nano silver particles is dissolved in monomer for the resin composition and the organic silver complex is decomposed with polymerization to prepare the synthetic resin composition containing the nano silver particles.

The present invention can provide a method for resin compositions, which has simple and economic preparation process and allows uniform dispersion of the nano silver particles in the resin composition.

5 Claims, 2 Drawing Sheets

METHOD FOR PREPARING RESIN COMPOSITIONS CONTAINING NANO SILVER PARTICLES

CROSS REFERENCE TO RELATED APPLICATIONS

This application is a continuation of U.S. patent application Ser. No. 12/808,489, filed Sep. 27, 2010, which is the United States national phase of International Patent Application No. PCT/KR2008/007323, filed Dec. 11, 2008, which claims priority to Korean Patent Application No. 10-2007-0131899, filed Dec. 17, 2007, each of which are incorporated herein by reference in their entirety.

TECHNICAL FIELD

The present invention relates to synthetic resin composition containing nano silver particles and a method for preparing the same, and more particularly, to a method for preparing a synthetic resin composition containing nano silver particles in which a silver complex having a specific structure that allows formation of the nano silver particles is dissolved in monomer for the resin composition and the organic silver complex is decomposed with polymerization to prepare the synthetic resin composition containing the nano silver particles and nano silver particles prepared therefrom.

BACKGROUND ART

In general, a synthetic resin composition is used as a raw material in a variety of fields including household supplies, synthetic fibers, filters, electronic materials and the like and requires functional reinforcement. As is well known, silver is a noble metal, which has no toxicity to humans and removes toxins. Also, the silver is known as a superior natural antibiotic which neutralizes enzymes related to metabolism of 650 or more species of pathogenic microorganisms including bacteria, viruses and mold and thus has an excellent effect on fungi and viruses as well as bacteria uncontrollable by general antibiotics. Therefore, a resin composition containing nano silver particles may be usefully used as an antibiotic resin, an antistatic resin, an electromagnetic wave shielding resin or the like.

The antibiotic resin composition may be utilized as a container for food and beverage, water supplying pipe, a container for a refrigerator, a water tank of a humidifier, a medical container and the like. Also, the resin composition containing nano silver particles dispersed therein may be effectively used as a material for electromagnetic wave shielding in electronic appliances and also widely used as a resin composition for preventing static electricity in home electronics.

In recent, there have been made many efforts to achieve cost reduction and simplified process in preparation of the resin composition containing the nano silver particles by increasing an affinity of the nano silver particles for the synthetic resin composition.

The resin composition containing the nano silver particles may be prepared by a variety of methods. In one example, Korean Patent Publication No. 2005-0047029 discloses a method of dispersing the nano silver particles using a physical force, in which, in a super mixer, polypropylene (PPJ700, Hyosung Corp., Korea) is put and rotated for 40 minutes with the temperature being increased to 55 to 65° C., nano silver particles colloidal solution is then put and rotated again for 20 to 30 minutes, and a wax (product name: X861, Bayer) is put as a dispersing agent and further rotated for 5 to 10 minutes to prepare the resin containing nano silver particles. In another example, Korean Patent Publication No. 2005-0079261 discloses a method of preparing a resin composition containing nano silver particles, in which a conventionally used mixer is heated to be maintained at a constant temperature, and a mixture of an general purpose plastic such as PVC and PE, an engineering plastic such as PET and PC and highly concentrated transparent colloidal silver aqueous solution is then put in the mixer and kneaded with stirring, followed by the extrusion by an extruder while the temperature being maintained suitably at 150 to 300° C. and cutting the extruded product to a predetermined size and shape.

In further another example, Korean Patent Publication No. 2003-0003203 discloses a method of preparing a resin composition containing nano silver particles, in which a synthetic resin composition, silver powder and aluminum powder are mixed and heated to a temperature of 180 to 230° C., followed by stirring by a stirrer to melt mix the silver powder.

According to the conventional methods as described above, a polymer resin composition is previously obtained from a monomer and then dispersed in colloidal solution or solid powder of nano silver particles which has been also previously prepared. Therefore, there are disadvantages that the preparation process is complex and uneconomic since a dispersing agent is needed to facilitate the dispersion and a physical force, e.g. an extruder, a melter, a stirrer or a super mixer is also needed.

Further, Korean Patent Publication No. 2003-0049007 discloses a method of preparing a resin composition containing silver particles by mixing a colloidal solution of nano-sized silver, monomers for a resin composition, an emulsifier and an initiator and then performing emulsion polymerization, suspension polymerization or microemulsion polymerization.

However, since the colloidal solution of nano silver particles is used in this method, an emulsifier or a dispersing agent is needed to facilitate the dispersion of the nano silver particles and there is a limitation in uniformity of the nano silver particles dispersed in the resin composition.

Meanwhile, Korean Patent Publication No. 2003-0031090 discloses a method of preparing unsaturated polyester composite containing nano silver particles, in which silver salt such as silver nitrate and silver acetate is dissolved in polar solvent such as acetonitrile and ethylene glycol and mixed with unsaturated polyester resin composition containing styrene monomer, followed by curing by a radical initiator and an accelerator to prepare the unsaturated polyester composite containing nano silver particles. This method is characterized in that silver ion is reduced and grown to the nano silver particles during radical polymerization. However, polar solvent for dissolving the silver salt is necessarily required since the silver salt such as silver nitrate and silver acetate is used and it is difficult to prepare a resin composition in which the nano silver particles are dispersed with high concentration since there is a limitation in uniformity and dispersibility of the nanoparticles contained in the polymer resin composition.

DISCLOSURE

Technical Problem

An object of the present invention is to provide a method for preparing synthetic resin compositions containing uniformly dispersed nano silver particles, in which a precursor, i.e. an organic silver complex, which allows formation of the nano silver particles is dissolved in a monomer to be polymerized to the resin composition and the organic silver complex is decomposed to form the nano silver particles during polymerization, unlike the conventional methods in which nano silver particles are dispersed in a previously synthesized polymer resin.

Another object of the present invention is to provide a preparation method, which does not use a separate physical dispersing device or dispersing agent and thus has simple and economic preparation process.

The present applicant has confirmed that silver is transformed to a stable silver complex in a form of a composite with ammonium carbonate or ammonium carbamate by reacting the ammonium carbonate or ammonium carbamate with a silver compound such as silver oxide and separated in a solid form, and silver thin film or nanoparticles may be easily prepared from the produced silver complex. This is disclosed in Korean Patent Application No. 2006-0011083 and Korean Patent Application No. 2006-0074246 by the present applicant.

The present inventors have confirmed that, when using the silver complex disclosed in the aforementioned applications, since there is no need for a polar solvent, which has been required when using silver salt such as silver nitrate and silver acetate in the conventional methods, the silver complex can be directly dissolve in various vinyl monomers and also silver particles having a size from several to tens nm are uniformly formed and dispersed in a synthetic resin composition with high concentration as the silver complex is gradually decomposed and reduced to silver particles during radical polymerization or subsequent heat treatment, and have achieved the present invention therefrom.

Therefore, an object of the present invention is to provide a method for preparing resin compositions containing nano silver particles, in which nano silver particles dispersed in the resin have uniform sizes and high dispersibility and can be dispersed in the resin with high concentration by using a silver complex having a specific structure which is highly stable and highly soluble in various vinyl monomers and decomposed at a low temperature to easily form nano silver particles.

Technical Solution

To achieve the above and other objects, the present invention provides a method for preparing resin compositions containing nano silver particles, which includes dissolving a silver complex having a specific structure in at least one vinyl monomer; and polymerizing the vinyl monomer.

The silver complex used in the present invention is prepared by reacting a silver compound represented by the formula 1 with one or a mixture of two or more selected from the group consisting of ammonium carbamate-based compound, ammonium carbonate-based compound and ammonium bicarbonate-based compound represented by the formula 2 to 4.

The silver complex is a stable silver complex in a form of a composite with ammonium carbonate or ammonium carbamate by adding the ammonium carbonate or the ammonium carbamate to a compound such as silver oxide and the silver complex is decomposed and separated as solids by heating to produce nano silver particles.

[Formula 1]

Ag$_n$X

[Formula 2]

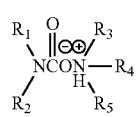

[Formula 3]

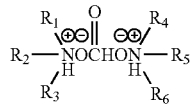

[Formula 4]

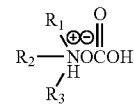

wherein, in the formulas 1 to 4, X is a substituent selected from the group consisting of oxygen, sulfur, halogen, cyano, cyanate, carbonate, nitrate, nitrite, sulfate, phosphate, thiocyanate, chlorate, perchlorate, tetrafluoroborate, acetylacetonate, carboxylate and derivatives thereof, n is an integer from 1 to 4, and $R_1$ to $R_6$ are independently selected from the group consisting of hydrogen, hydroxyl group, $C_1$-$C_{30}$ alkoxy group, $C_3$-$C_{20}$ aryloxy group, $C_1$-$C_{30}$ aliphatic or $C_3$-$C_{20}$ cycloaliphatic alkyl group or $C_3$-$C_{20}$ aryl or $C_4$-$C_{30}$ aralkyl group as a mixture thereof, substituted $C_1$-$C_{30}$ alkyl group, substituted $C_3$-$C_{20}$ aryl group, substituted $C_4$-$C_{30}$ aralkyl group, $C_3$-$C_{20}$ heterocyclic compound including a heteroatom selected from the group consisting of N, S and O, polymer compound and derivatives thereof, wherein when $R_1$ to $R_6$ are substituted or unsubstituted alkyl group or aralkyl group, alkyl group or aralkyl group may contain a heteroatom selected from the group consisting of N, S and O, or an unsaturated bond in the carbon chain, wherein $R_1$ and $R_2$ or $R_4$ and $R_5$, independently, may form an alkylene ring containing or not containing a heteroatom.

Examples for the substituted functional group may include, but not limited to, $C_1$-$C_{30}$ alkoxy group, carboxyl group, tri($C_1$-$C_7$)alkoxysilyl group, hydroxyl group and cyano group.

Specific examples for the compound of the formula 1 are, but not limited to, silver oxide, silver thiocyanate, silver sulfide, silver chloride, silver cyanide, silver cyanate, silver carbonate, silver nitrate, silver nitrite, silver sulfate, silver phosphate, silver perchlorate, silver tetrafluoroborate, silver acetylacetonate, silver acetate, silver lactate, silver oxalate or a derivative thereof.

Also, specific examples for the substituents $R_1$ to $R_6$ of the formulas 2 to 4 may be selected from, but not particularly limited to, the group consisting of hydrogen, methyl, ethyl, propyl, isopropyl, butyl, isobutyl, amyl, hexyl, ethylhexyl, heptyl, octyl, isooctyl, nonyl, decyl, dodecyl, hexadecyl, octadecyl, docodecyl, cyclopropyl, cyclopentyl, cyclohexyl, allyl, hydroxy, methoxy, hydroxyethyl, methoxyethyl, 2-hydroxypropyl, methoxypropyl, cyanoethyl, ethoxy, butoxy, hexyloxy, methoxyethoxyethyl, methoxyethoxyethoxyethyl, hexamethyleneimine, morpholine, piperidine, piperazine, ethylenediamine, propylenediamine, hexamethylenediamine, triethylenediamine, pyrrole, imidazole, pyridine, carboxymethyl, trimethoxysilylpropyl, triethoxysilylpropyl, phenyl, methoxyphenyl, cyanophenyl, phenoxy, tolyl, benzyl and a derivative thereof, a polymer compound such as polyallylamine and polyethyleneimine and a derivative thereof.

In specific examples of the compound, the ammonium carbamate-based compound represented by the formula 2 may be one or a mixture of two or more selected from the group consisting of ammonium carbamate, ethylammonium ethylcarbamate, isopropylammonium isopropylcarbamate, n-butylammonium n-butylcarbamate, isobutylammonium isobutylcarbamate, t-butylammonium t-butylcarbamate, 2-ethylhexylammonium 2-ethylhexylcarbamate, octadecylammonium octadecylcarbamate, 2-methoxyethylammonium 2-methoxyethylcarbamate, 2-cyanoethylammonium 2-cyanoethylcarbamate, dibutylammonium dibutylcarbamate, dioctadecylammonium dioctadecylcarbamate, methyldecylammonium methyldecylcarbamate, hexamethyleneiminium hexamethyleneiminecarbamate, morpholinium morpholinecarbamate, pyridinium ethylhexylcarbamate, triethylenediaminium isopropylbicarbamate, benzylammonium benzylcarbamate, triethoxysilylpropylammonium triethoxysilylpropylcarbamate and a derivative thereof. The ammonium carbonate-based compound represented by the formula 3 may be one or a mixture of two or more selected from the group consisting of ammonium carbonate, ethylammonium ethyl carbonate, isopropylammonium isopropylcarbonate, n-butylammonium n-butylcarbonate, isobutylammonium isobutylcarbonate, t-butylammonium t-butylcarbonate, 2-ethylhexylammonium 2-ethylhexylcarbonate, 2-methoxyethylammonium 2-methoxyethylcarbonate, 2-cyanoethylammonium 2-cyanoethylcarbonate, octadecylammonium octadecylcarbonate, dibutylammonium dibutylcarbonate, dioctadecylammonium dioctadecylcarbonate, methyldecylammonium methyldecylcarbonate, hexamethyleneiminium hexamethyleneiminecarbonate, morpholinium morpholinecarbonate, benzylammonium benzylcarbonate, triethoxysilylpropylammonium triethoxysilylpropylcarbonate, triethylenediaminium isopropylcarbonate and a derivative thereof. The ammonium bicarbonate-based compound represented by the formula 4 may be one or a mixture of two or more selected from the group consisting of ammonium bicarbonate, isopropylammonium bicarbonate, t-butylammonium bicarbonate, 2-ethylhexylammonium bicarbonate, 2-methoxyethylammonium bicarbonate, 2-cyanoethylammonium bicarbonate, dioctadecylammonium bicarbonate, pyridinium bicarbonate, triethylenediaminium bicarbonate and a derivative thereof.

Meanwhile, methods of preparing the ammonium carbamate-based compound, ammonium carbonate-based compound and ammonium bicarbonate-based compound are not particularly limited. For example, U.S. Pat. No. 4,542,214 (Sep. 17, 1985) discloses that ammonium carbamate compound can be prepared from primary amine, secondary amine, tertiary amine or a mixture of at least one thereof and carbon dioxide. Ammonium carbonate-based compound may be obtained if 0.5 mole of water is added per 1 mole of amine, and ammonium bicarbonate-based compound may be obtained when 1 mole or more of water is added. The preparation may be performed under atmospheric or increased pressure without a solvent, or in the presence of such solvent as water, alcohols like methanol, ethanol, isopropanol and butanol, glycols like ethylene glycol and glycerine, acetates like ethyl acetate, butyl acetate and carbitol acetate, ethers like diethyl ether, tetrahydrofuran and dioxane, ketones like methyl ethyl ketone and acetone, hydrocarbons like hexane and heptane, aromatic hydrocarbons like benzene and toluene and halogen-substituted solvents like chloroform, methylene chloride and carbon tetrachloride. The carbon dioxide may be bubbled in gas phase or used in the form of dry ice.

Alternatively, the preparation may be performed in the supercritical phase. Any other known methods can be applied in the preparation of the ammonium carbamate-based, ammonium carbonate-based or ammonium bicarbonate-based compound used in the present invention, provided that the final structure is the same. That is, solvent, reaction temperature, concentration, catalyst, etc. are not particularly limited in the preparation. Nor the preparation yield is particularly limited.

The amount of silver complex is 0.01 to 5 wt %, preferably 0.05 to 1 wt % for total weight of a mixture of vinyl monomer and the silver complex. An effect due to nano silver particles, i.e. antibiotic effect, electromagnetic wave shielding effect or an antistatic effect is insignificant when the content of the silver complex is less than 0.01 wt %, and it is uneconomic as the effect is insignificantly increased and physical properties of polymer resin may be affected when the content of the silver complex is more than 5 wt %. Also, solubility in monomer is determined by a length of alkyl chain ($R_1$ to $R_6$) in ammonium group. As the length of the alkyl chain becomes longer, hydrophobia is increased to increase solubility in non-polar monomer such as styrene and, as the length of the alkyl chain becomes shorter and branches are more increased, solubility in polar monomer such as vinylpyrrolidone is increased. Particularly, upon production of nano silver particles and decomposition of ammonium carbamate-based, ammonium carbonate-based and ammonium bicarbonate-based compound at a polymerization temperature, it is preferred to be highly volatile to facilitate removal.

The vinyl monomer is a monomer which allows radical polymerization and may be selected according to the use or the purpose. Therefore, the sort of the vinyl monomer is not particularly limited, but is preferred to be highly soluble in silver complex. The vinyl monomer may be introduced by an amount of 95 to 99.99 wt %, preferably 99 to 99.95 wt % though it depends on the structure of the silver complex and the solubility of the vinyl monomer according to the polarity thereof. The vinyl monomer may be one or a mixture of two or more selected from alkyl group-containing vinyl monomers like methylacrylate, methylmethacrylate, ethylacrylate, ethylmethacrylate, propylacrylate, propylmethacrylate, butylacrylate, butylmethacrylate, hexylacrylate, hexylmethacrylate, octylacrylate, 2-ethylhexylacrylate; hydroxyethylacrylate, hydroxyethylmethacrylate, hydroxypropylacrylate, hydroxypropylmethacrylate, hydroxybutylacrylate, hydroxybutylmethacrylate, hydroxyhexylacrylate, hydroxyhexylmethacrylate; N-substituted amide-based vinyl monomers like N,N-dimethylacrylamide and N,N-dimethylmethacrylamide; alkoxyalkylacrylate-based vinyl monomers like methoxyethylacrylate, methoxyethylmethacrylate, ethoxyethylacrylate and ethoxyethylmethcrylate; vinyl monomers like vinylchloride, vinylidene chloride, vinylfluoride, vinylidene fluoride, vinylacetate, vinylpropionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxamides, styrene, α-methylstyrene, and N-vinylcaprolactam; cyanoacrylate monomers like acrylonitrile and methacrylonitrile; epoxy group-containing acrylic monomers like glycidylacrylate and glycidylmethacrylate; glycol acrylester monomers like ethyleneglycolacrylate, ethyleneglycolmethacrylate, propyleneglycolacrylate, propyleneglycolmethacrylate, methoxyethyleneglycolacrylate, methoxyethyleneglycolmethacrylate, methoxypropyleneglycolacrylate and methoxypropyleneglycolmethacrylate; acrylic acid ester monomers like tetrahydrofurfuryl acrylate, tetrahydrofurfuryl methacrylate and 2-methoxyethyl acrylate; and monomers like isoprene, butadiene, isobutylene, vinyl ether, diallylphthalate and diallylcarbonate.

The silver complex is dissolved in at least one aforementioned vinyl monomer and then radically polymerized.

The radical polymerization may include known methods such as bulk polymerization, suspension polymerization, solution polymerization and emulsion polymerization, but not particularly limited thereto. Also, a radical polymerization initiator may be selected from the group consisting of α,α'-azobisisobutyronitrile (AIBN), dibenzoylperoxide, tertiarybutylperoxybenzoate, ditertiarybutylperoxide, tertiarybutylperoxy 2-ethylhexanoate, tertiarybutylperoxyacetate, cumylhydroperoxide, dicumylperoxide and tertiarybutylhydroperoxide.

During the radical polymerization, the silver complex is decomposed and silver ion is reduced to form nano silver particles. If necessary, heat treatment may be performed after the polymerization. The heat treatment may be performed by any known heat treating methods and preferably performed at 40 to 200° C., more preferably 80 to 150° C. Though the reaction for decomposition and reduction of the silver complex may be performed at a temperature below 40° C. or above 200° C., reduction speed is low at below 40° C. and the heat treatment temperature is unnecessarily high at above 200° C.

DESCRIPTION OF DRAWINGS

The above and other objects, features and advantages of the present invention will become apparent from the following description of preferred embodiments given in conjunction with the accompanying drawings, in which.

BEST MODE

Figure 1:
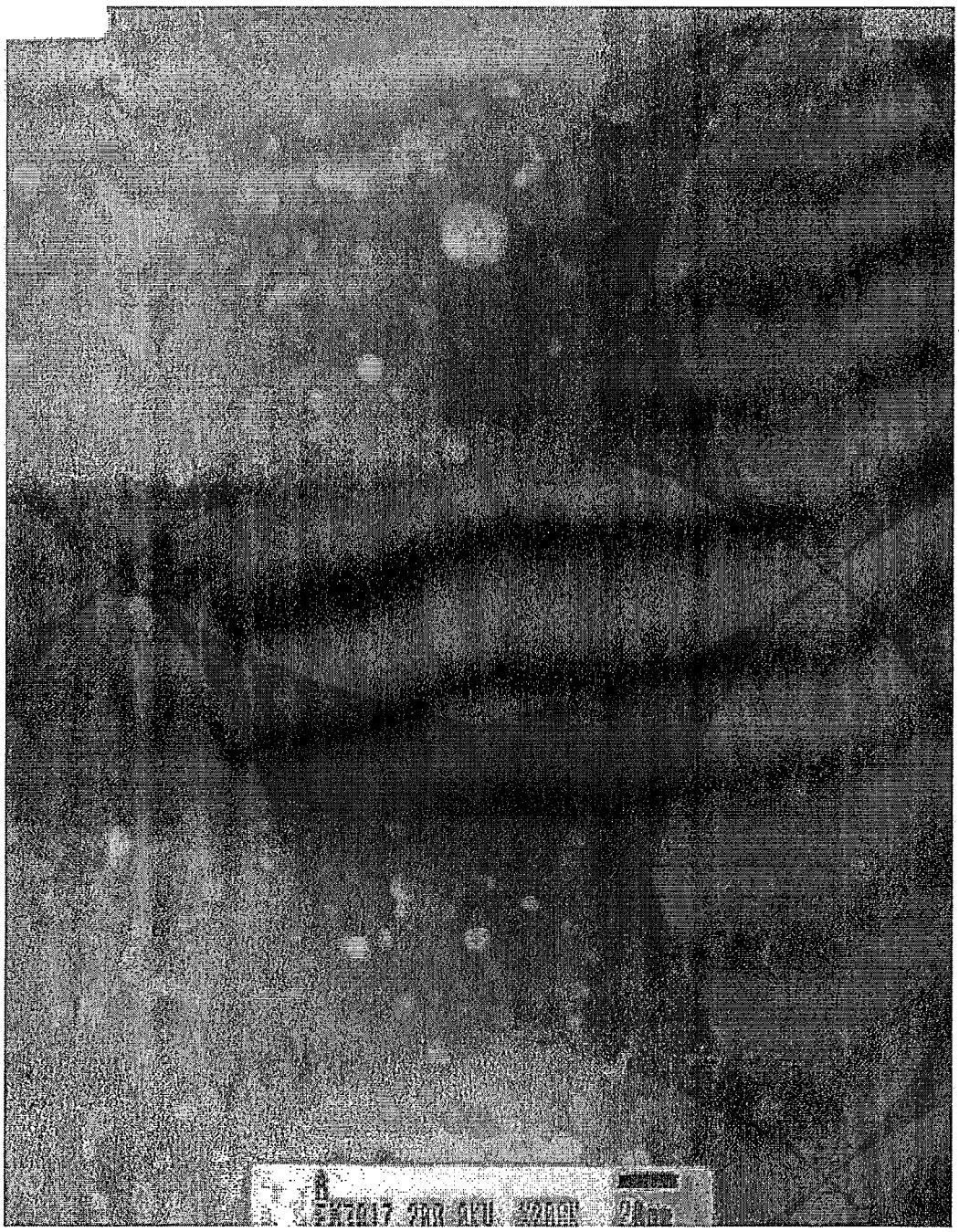
FIG. 1 is a Transmission Electron Microscope (TEM) photograph illustrating polymethylmethacrylate (PMMA) containing nano silver particles of Example 4 of the present invention.

Practical and presently preferred embodiments of the present invention are illustrative as shown in the following Examples.

However, it will be appreciated that those skilled in the art, on consideration of this disclosure, may make modifications and improvements within the spirit and scope of the present invention.

PREPARATION EXAMPLES

Preparation of Silver Complex

Silver complexes were prepared using silver compound and ammonium compound as described in the following Preparation Examples.

Preparation Example 1

In a 50 mL Schlenk flask equipped with a stirrer, 3.25 g (10.75 mmol) of 2-ethylhexylammonium 2-ethylhexylcarbamate (viscous liquid) was dissolved in 10 mL of methanol. 1.0 g (4.31 mmol) of silver oxide was added and reaction was performed at room temperature. The reaction solution was initially a black slurry but it turned transparent as complex was produced. After 2 hours of reaction, a colorless, transparent solution was obtained. The resultant solution was filtered with a 0.45 micron membrane filter to remove unreacted silver oxide. Then, the solvent was removed under vacuum to obtain white solid. The solid was recrystallized in ethyl acetate, dried and weighed to obtain 4.22 g of a silver complex (yield=99.4%).

Preparation Example 2

In a 50 mL Schlenk flask equipped with a stirrer, 3.72 g (11.61 mmol) of 2-ethylhexylammonium 2-ethylhexylcarbonate (viscous liquid) was dissolved in 10 mL of methanol. 1.0 g (4.31 mmol) of silver oxide was then added. The reaction solution was initially a black slurry but it turned transparent as the reaction was performed. After 2 hours of reaction, a colorless, transparent solution was obtained. The resultant solution was filtered with a 0.45 micron membrane filter to remove unreacted silver oxide. Then, the solvent was removed under vacuum to obtain white solid. The solid was dried and weighed to obtain 4.02 g of a silver complex (yield=85.2%).

Preparation Example 3

In a 50 mL Schlenk flask equipped with a stirrer, 4.86 g (25.37 mmol) of 2-ethylhexylammonium bicarbonate (viscous liquid) was dissolved in 10 mL of methanol. 1.0 g (4.31 mmol) of silver oxide was then added. The reaction solution was initially a black slurry but it turned transparent as the reaction was performed. After 2 hours of reaction, a colorless, transparent solution was obtained. The resultant solution was filtered with a 0.45 micron membrane filter. Then, the solvent was removed under vacuum to obtain white solid. The solid was dried and weighed to obtain 4.33 g of a silver complex (yield=73.9%).

Preparation Example 4

In a 50 mL Schlenk flask equipped with a stirrer, 2.04 g (10.75 mmol) of isobutylammonium isobutylcarbamate (white solid, melting point: 80-82° C.) was dissolved in 10 mL of methanol. 1.0 g (4.31 mmol) of silver oxide was added and reaction was performed at room temperature. The reaction solution was initially a black slurry but it turned transparent as complex was produced. After 2 hours of reaction with stirring, a colorless, transparent solution was obtained.

The resultant solution was filtered with a 0.45 micron membrane filter. Then, the solvent was removed under vacuum to obtain white solid. The solid was dried and weighed to obtain 2.87 g of a silver complex (yield=94.4%).

Preparation Example 5

In a 50 mL Schlenk flask equipped with a stirrer, 1.60 g (10.75 mmol) of isopropylammonium isopropylcarbamate (white solid, melting point: 78-80° C.) was dissolved in 10 mL of methanol. 1.0 g (4.31 mmol) of silver oxide was added and reaction was performed at room temperature. The reaction solution was initially a black slurry but it turned transparent as complex was produced. After 2 hours of reaction with stirring, a colorless, transparent solution was obtained.

The resultant solution was filtered with a 0.45 micron membrane filter. Then, the solvent was removed under vacuum to obtain white solid. The solid was dried and weighed to obtain 2.48 g of a silver complex (yield=95.5%).

Preparation Example 6

In a 50 mL Schlenk flask equipped with a stirrer, 3.27 g (10.80 mmol) of 2-ethylhexylammonium 2-ethylhexylcarbamate (viscous liquid) was dissolved in 10 mL of methanol. 1.0 g (3.60 mmol) of silver carbonate was added. The reaction solution was initially a yellow slurry but it turned transparent as the reaction was performed. After 5 hours of reaction, a yellow, transparent solution was obtained. The resultant solution was filtered with a 0.45 micron membrane filter. Then, the solvent was removed under vacuum to obtain white solid. The solid was dried and weighed to obtain 4.18 g of a silver complex (yield=97.89%).

Preparation Example 7

In a 50 mL Schlenk flask equipped with a stirrer, 2.97 g (24.51 mmol) of isopropylammonium bicarbonate (melting point: 53-54° C.) was dissolved in 10 mL of methanol. 1.0 g (3.60 mmol) of silver oxide was added. The reaction solution was initially a black slurry but it turned transparent as the reaction was performed. After 2 hours of reaction, a colorless, transparent solution was obtained. The resultant solution was filtered with a 0.45 micron membrane filter. Then, the solvent was removed under vacuum to obtain white solid. The solid was dried and weighed to obtain 2.41 g of a silver complex (yield=60.7%).

Preparation Example 8

In a 50 mL Schlenk flask equipped with a stirrer, 3.20 g (23.65 mmol) of isobutylammonium bicarbonate (white solid) was dissolved in 10 mL of methanol. 1.0 g (4.31 mmol) of silver oxide was then added. The reaction solution was initially a black slurry but it turned transparent as the reaction was performed. After 2 hours of reaction, a colorless, transparent solution was obtained. The resultant solution was filtered with a 0.45 micron membrane filter. Then, the solvent was removed under vacuum to obtain white solid. The solid was dried and weighed to obtain 3.21 g of a silver complex (yield=76.42%).

EXAMPLES

Preparation of Resin Compositions Containing Nano Silver Particles

Resin compositions containing nano silver particles were prepared with varying monomer, polymerization method and silver complex as Table 1 below.

Example 1

Preparation of Polystyrene Containing Nano Silver Particles 0.05 g of the silver complex of Preparation Example 1 was dissolved in 18.4 g (0.172 mol) of styrene, a hydrophobic monomer. α,α'-azobisisobutyronitrile (1 mold of the monomer), an initiator was dissolved. The solution was put in a 50 mL polymerization ample and a freeze-thaw method was performed to remove gas, followed by sealing the ample to perform radical polymerization at 70° C. for 24 hours.

After completion of the polymerization, the ample was opened and an obtained resin was heated at a final temperature of 140° C. to remove volatile decomposed product, thereby preparing final polystyrene containing nano silver particles.

Example 2

Preparation of Polystyrene Containing Nano Silver Particles

Polystyrene containing nano silver particles was prepared by the same manner as in Example 1, except that the silver complex of Preparation Example 2 was used instead of the silver complex of Preparation Example 1.

Example 3

Preparation of Polystyrene Containing Nano Silver Particles

Polystyrene containing nano silver particles was prepared by the same manner as in Example 1, except that the silver complex of Preparation Example 3 was used instead of the silver complex of Preparation Example 1.

TABLE 1

| Sort | Monomer | Diameter of silver particle (nm) | Polymerization method | Initiator | Silver complex |
|---|---|---|---|---|---|
| Example 1 | Styrene | 5-20 | Bulk polymerization | AIBN | Preparation Example 1 |
| Example 2 | Styrene | 5-20 | Bulk polymerization | AIBN | Preparation Example 2 |
| Example 3 | Styrene | 5-20 | Bulk polymerization | AIBN | Preparation Example 3 |
| Example 4 | Methylmethacrylate | 5-20 | Bulk polymerization | AIBN | Preparation Example 4 |
| Example 5 | 2-hydroxyethylmethacrylate | 5-20 | Bulk polymerization | AIBN | Preparation Example 5 |
| Example 6 | Vinyl Pyrrolidone | 5-20 | Bulk polymerization | DTBP | Preparation Example 5 |
| Example 7 | Vinyl Pyrrolidone | 5-20 | Bulk polymerization | DTBP | Preparation Example 6 |
| Example 8 | Vinyl Pyrrolidone | 5-20 | Bulk polymerization | DTBP | Preparation Example 7 |
| Example 9 | Styrene | 5-20 | Suspension polymerization | AIBN | Preparation Example 1 |
| Example 10 | Styrene | 5-20 | Suspension polymerization | AIBN | Preparation Example 2 |
| Example 11 | Methylmethacrylate | 5-20 | Bulk polymerization | DTBP | Preparation Example 4 |
| Example 12 | Methylmethacrylate | 5-20 | Bulk polymerization | DTBP | Preparation Example 8 |
| Example 13 | 2-ethylhexylacrylate butylacrylate 2-hydroxyethylmethacrylate | 5-20 | Solution polymerization | AIBN | Preparation Example 5 |

Example 4

Preparation of Polymethylmethacrylate Containing Nano Silver Particles

Polymethylmethacrylate containing nano silver particles was prepared by the same manner as in Example 1, except that methylmethacrylate was used as a monomer instead of the styrene and the silver complex of Preparation Example 4 was used instead of the silver complex of Preparation Example 1.

Example 5

Polyhydroxyethylmethacrylate Containing Nano Silver Particles

Polyhydroxyethylmethacrylate containing nano silver particles was prepared by the same manner as in Example 1, except that hydroxyethylmethacrylate was used as a monomer instead of the styrene and the silver complex of Preparation Example 5 was used instead of the silver complex of Preparation Example 1.

Example 6

Polyvinylpyrrolidone Containing Nano Silver Particles 0.05 g of the silver complex of Preparation Example 5 was dissolved in 19.12 g (0.172 mol) of N-vinylpyrrolidone. Di-t-butylperoxide (1 mol % of the monomer), an initiator was dissolved. The solution was put in a 50 mL polymerization ample and a freeze-thaw method was performed to remove gas, followed by sealing the ample to perform radical polymerization at 125° C. for 24 hours. After completion of the polymerization, the ample was opened and an obtained resin was heated at a final temperature of 140° C. to remove volatile decomposed product, thereby preparing final polyvinylpyrrolidone containing nano silver particles.

Example 7

Preparation of Polyvinylpyrrolidone Containing Nano Silver Particles

Polyvinylpyrrolidone containing nano silver particles was prepared by the same manner as in Example 6, except that the silver complex of Preparation Example 6 was used instead of the silver complex of Preparation Example 5.

Example 8

Preparation of Polyvinylpyrrolidone Containing Nano Silver Particles

Polyvinylpyrrolidone containing nano silver particles was prepared by the same manner as in Example 6, except that the silver complex of Preparation Example 7 was used instead of the silver complex of Preparation Example 5.

Example 9

Preparation of Polystyrene Containing Nano Silver Particles by Suspension Polymerization 0.5 g of the silver complex of Preparation Example 1 and α,α'-azobisisobutyronitrile (1 mol % of the monomer), an initiator were completely dissolved in 90.2 g (0.86 mol) of styrene and then degasified. The solution was dropped in 500 g of a solution, in which 5 wt % of barium sulfate and 5 wt % of polyvinylalcohol (mean molecular weight, Mw: 50000) as a stabilizer were dissolved, under nitrogen stream with stirring at a speed of 44 rpm to perform dispersion. Radical polymerization was performed at 70° C. for 24 hours with continuous stirring. After completion of the polymerization, the polymerized product was left for 1 hour and then filtered to remove precipitate. The obtained nanoparticulate polystyrene resin was treated at 130° C. for 30 minutes, thereby obtaining final polystyrene containing nano silver particles.

Example 10

Preparation of Polystyrene Containing Nano Silver Particles by Suspension Polymerization Polystyrene containing nano silver particles was prepared by the same manner as in Example 9, except that the silver complex of Preparation Example 2 was used instead of the silver complex of Preparation Example 1.

Example 11

Preparation of Polymethylmethacrylate Containing Nano Silver Particles by Bulk Polymerization Di-t-butylperoxide (0.2 mol % of the monomer), a radical initiator and 0.5 g of silver complex of Preparation Example 4 were completely dissolved in 90.0 g (0.900 mol) of methylmethacrylate. The solution was put in a 500 mL three necked round bottom flask equipped with a condenser, a nitrogen injection pipe and a stirrer and the flask was then substituted with nitrogen. After that, polymerization reaction was performed for 30 minutes at 80° C., for 50 minutes at 85° C., for 4 hours at 60° C., for 6 hours at 95° C. and for 1 hour at 130° C. to a bulk polymer of polymethylmethacrylate.

Example 12

Preparation of Polymethylmethacrylate Containing Nano Silver Particles by Bulk Polymerization Polymethylmethacrylate containing nano silver particles was prepared by the same manner as in Example 11, except that the silver complex of Preparation Example 8 was used instead of the silver complex of Preparation Example 4.

Example 13

Nano Silver Particles Dispersed Acryl Resin by Solution Polymerization of Acryl 30 g of 2-ethylhexylacrylate, 30 g of butylacrylate, 6 g of 2-hydroxyethylacrylate and 2.78 g of isopropylammonium carbamate were dissolved in 81 g of ethylacetate and 28 g of methylalcohol. 0.01 g of α,α'-azobisisobutyronitrile, an initiator was put and initial reaction was performed with 20 minutes of stirring. After that, as a polymerization step, a mixture solution of 89 g of 2-ethylhydroxyacrylate, 89 g of butylacrylate, 20 g of 2-hydroxyethylacrylate, 101 g of ethylacetate, 52 g of methylalcohol and 0.5 g of α,α'-azobisisobutyronitrile was dropped for 90 minutes, followed by 90 minutes of stirring. In a termination step, a mixture solution of 50 g of ethylacetate, 50 g of methylalcohol and 1 g of α,α'-azobisisobutyronitrile was dropped for 60 minutes, followed by 180 minutes of stirring. Finally, 200 g of ethylacetate and 120 g of methylalcohol were put, followed by 20 minutes of stirring to prepare silver dispersed acrylic synthetic resin composition having a solid content of 35 wt %.

Figure 2:
FIG. 2 is a TEM photograph illustrating polyvinylpyrrolidone (PVP) containing nano silver particles of Example 6 of the present invention.

To confirm a dispersibility of the resin compositions containing nano silver particles, a sample solid thin film was prepared using an ultra sawing machine. The polymethylmethacrylate prepared in Example 4 and the polyvinylpyrrolidone prepared in Example 6 were dissolved in toluene and laid on a grid and observed with Transmission Electron Microscope (TEM, model: JEOL JEM-2000 FXII), respectively. The results were shown in FIGS. 1 and 2, respectively. As shown in FIGS. 1 and 2, it could be appreciated that the resin compositions prepared according to the present invention have uniformly sized and uniformly dispersed silver particles.

INDUSTRIAL APPLICABILITY

As described above, the present invention provides a method for preparing resin compositions containing uniformly dispersed nano silver particles by dissolving a silver complex having a specific structure in at least one vinyl monomer and performing polymerization.

The silver complex according to the present invention is decomposed to silver, amine and carbon dioxide by heat applied during the polymerization and nano silver particles are produced simultaneously with the polymerization. This silver complex has a solubility in vinyl monomer having various polarities according to a length and chemical structure of alkyl group in the amine and it is therefore possible to prepare homopolymer and copolymer in which various nano silver particles are dispersed. Also, the dispersibility of the nano silver particles is very high and it is therefore possible to prepare a synthetic resin in which silver nanoparticles of high concentration are uniformly dispersed.

Further, the method for preparing resin compositions containing nano silver particles may be applied in various polymerization methods such as a bulk polymerization, a suspension polymerization and a solution polymerization and it is therefore possible to prepare resin composition containing nano silver particles usable for various uses.

Furthermore, the resin composition containing nano silver particles according to the present invention is an antibiotic resin and it is therefore possible to provide a superior composition usable for water supplying pipe, an antibiotic container for a refrigerator, a material for electromagnetic wave shielding and an antistatic coat. When the concentration of the nano silver particles complex is increased, it is possible to reduce the number of process steps by a master batch in which the nano silver particles are mixed in a material for a general purpose synthetic resin with increased concentration. Therefore, it is economic and cost- and process time-saving.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:
1. A method for preparing resin compositions containing uniformly dispersed nano silver particles having uniform sizes and high dispersibility, comprising: directly dissolving a silver complex prepared by reacting a silver compound represented by the formula 1 below with one or a mixture of two or more selected from the group consisting of ammonium carbamate-based compound, ammonium carbonate-based compound and ammonium bicarbonate-based compound represented by the formula 2 to 4, in a vinyl monomer in the absence of a polar solvent and a dispersing agent; radically polymerizing the vinyl monomer in the presence of a radical polymerization initiator; carrying out decomposition of the silver complex and reduction of silver ion to form nano silver particles during the radical polymerization; and removing volatile decomposed product by heating the obtained resin after completion of the radical polymerization,
wherein the radical polymerization initiator is selected from the group consisting of α,α'-azobisisobutyronitrile (AIBN), dibenzoylperoxide, tertiarybutylperoxybenzoate, ditertiarybutylperoxide, tertiarybutylperoxy 2-ethylhexanoate, tertiarybutylperoxyacetate, cumylhydroperoxide, dicumylperoxide and tertiarybutylhydroperoxide,
wherein the vinyl monomer is one or a mixture of two or more selected from the group consisting of alkyl group-containing vinyl monomer, hydroxyl group-containing vinyl monomer, N-substituted amide-based vinyl monomer, alkoxyalkylacrylate-based vinyl monomer, cyanoacrylate monomer, epoxy group-containing acrylic monomer, acrylic acid ester monomer,

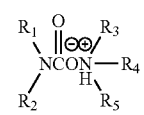
[Formula 1]

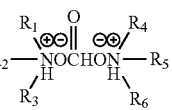
[Formula 2]

[Formula 3]

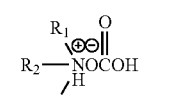
[Formula 4]

wherein, the silver compound represented by the formula 1 is one or a mixture of two or more selected from the group consisting of silver oxide, silver thiocyanate, silver cyanide, silver cyanate, silver carbonate, silver nitrate, silver nitrite, silver sulfate, silver phosphate, silver perchlorate, silver tetrafluoroborate, silver acetylacetonate, silver acetate, silver lactate, silver oxalate and a derivative thereof, the ammonium carbamate-based compound of the formula 2 is one or a mixture of two or more selected from the group consisting of ethylammonium ethylcarbamate, isopropylammonium isopropylcarbamate, n-butylammonium n-butylcarbamate, isobutylammonium isobutylcarbamate, t-butylammonium t-butylcarbamate, 2-ethylhexylammonium 2-ethylhexylcarbamate, octadecylammonium octadecylcarbamate, 2-methoxyethylammonium 2-methoxyethylcarbamate, 2-cyanoethylammonium 2-cyanoethylcarbamate, dibutylammonium dibutylcarbamate, dioctadecylammonium dioctadecylcarbamate, methyldecylammonium methyldecylcarbamate, hexamethyleneiminium hexamethyleneiminecarbamate, morpholinium morpholinecarbamate, pyridinium ethylhexylcarbamate, triethylenediaminium isopropylbicarbamate, benzylammonium benzylcarbamate, triethoxysilylpropylammonium triethoxysilylpropylcarbamate and a derivative thereof, the ammonium carbonate-based compound represented by the formula 3 is one or a mixture of two or more selected from the group consisting of ethylammonium ethylcarbonate, isopropylammonium isopropylcarbonate, n-butylammonium n-butylcarbonate, isobutylammonium isobutylcarbonate, t-butylammonium t-butylcarbonate, 2-ethylhexylammonium 2-ethylhexylcarbonate, 2-methoxyethylammonium 2-methoxyetylcarbonate, 2-cyanoethylammonium 2-cyanoethylcarbonate, octadecylammonium octadecylcarbonate, dibutylammonium dibutylcarbonate, dioctadecylammonium dioctadecylcarbonate, methyldecylammonium methyldecylcarbonate, hexamethyleneiminium hexamethyleneiminecarbonate, morpholinium morpholinecarbonate, benzylammonium benzylcarbonate, triethoxysilylpropylammonium triethoxysilylpropylcarbonate, triethylenediaminium isopropylcarbonate and a derivative thereof, and the ammonium bicarbonate-based compound represented by the formula 4 is one or a mixture of two or more selected from the group consisting of isopropylammonium bicarbonate, t-butylammonium bicarbonate, 2-ethylhexylammonium bicarbonate, 2-methoxyethylammonium bicarbonate, 2-cyanoethylammonium bicarbonate, dioctadecylammonium bicarbonate, pyridinium bicarbonate, triethylenediaminium bicarbonate and a derivative thereof.

2. A method for preparing resin compositions containing uniformly dispersed nano silver particles having uniform sizes and high dispersibility, comprising: directly dissolving a silver complex prepared by reacting a silver compound represented by the formula 1 below with one or a mixture of two or more selected from the group consisting of ammonium carbamate-based compound, ammonium carbonate-based compound and ammonium bicarbonate-based compound represented by the formula 2 to 4, in a vinyl monomer in the absence of a polar solvent and a dispersing agent; radically polymerizing the vinyl monomer in the presence of a radical polymerization initiator; carrying out decomposition of the silver complex and reduction of silver ion to form nano silver particles during the radical polymerization; and removing volatile decomposed product by heating the obtained resin after completion of the radical polymerization, wherein the radical polymerization initiator is selected from the group consisting of α,α'-azobisisobutyronitrile (AIBN), dibenzoylperoxide, tertiarybutylperoxybenzoate, ditertiarybutylperoxide, tertiarybutylperoxy 2-ethylhexanoate, tertiarybutylperoxyacetate, cumylhydroperoxide, dicumylperoxide and tertiarybutylhydroperoxide, wherein the silver complex is prepared by adding carbon dioxide to amine compound corresponding to one of the compounds of the formulas 2 to 4 to prepare corresponding ammonium carbamate-based compound, ammonium carbonate-based compound or ammonium bicarbonate-based compound, and reacting the prepared compound with the silver compound of the formula 1, wherein the vinyl monomer is one or a mixture of two or more selected from the group consisting of alkyl group-containing vinyl monomer, hydroxyl group-containing vinyl monomer, N-substituted amide-based vinyl monomer, alkoxyalkylacrylate-based vinyl monomer, cyanoacrylate monomer, epoxy group-containing acrylic monomer, acrylic acid ester monomer,

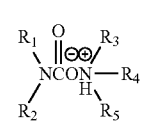
[Formula 1]

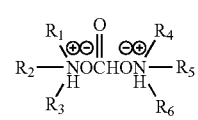
[Formula 2]

[Formula 3]

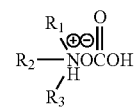
[Formula 4]

wherein, in the formula 1, X is a substituent selected from the group consisting of oxygen, sulfur, halogen, cyano, cyanate, carbonate, nitrate, nitrite, sulfate, phosphate, thiocyanate, chlorate, perchlorate, tetrafluoroborate, acetylacetonate, carboxylate and derivatives thereof, n is an integer from 1 to 4, the ammonium carbamate-based compound of the formula 2 is one or a mixture of two or more selected from the group consisting of ethylammonium ethylcarbamate, isopropylammonium isopropylcarbamate, n-butylammonium n-butylcarbamate, isobutylammonium isobutylcarbamate, t-butylammonium t-butylcarbamate, 2-ethylhexylammonium 2-ethylhexylcarbamate, octadecylammonium octadecylcarbamate, 2-methoxyethylammonium 2-methoxyethylcarbamate, 2-cyanoethylammonium 2-cyanoethylcarbamate, dibutylammonium dibutylcarbamate, dioctadecylammonium dioctadecylcarbamate, methyldecylammonium methyldecylcarbamate, hexamethyleneiminium hexamethyleneiminecarbamate, morpholinium morpholinecarbamate, pyridinium ethylhexylcarbamate, triethylenediaminium isopropylbicarbamate, benzylammonium benzylcarbamate, triethoxysilylpropylammonium triethoxysilylpropylcarbamate and a derivative thereof, the ammonium carbonate-based compound represented by the formula 3 is one or a mixture of two or more selected from the group consisting of ethylammonium ethylcarbonate, isopropylammonium isopropylcarbonate, n-butylammonium n-butylcarbonate, isobutylammonium isobutylcarbonate, t-butylammonium t-butylcarbonate, 2-ethylhexylammonium 2-ethylhexylcarbonate, 2-methoxyethylammonium 2-methoxyethylcarbonate, 2-cyanoethylammonium 2-cyanoethylcarbonate, octadecylammonium octadecylcarbonate, dibutylammonium dibutylcarbonate, dioctadecylammonium dioctadecylcarbonate, methyldecylammonium methyldecylcarbonate, hexamethyleneiminium hexamethyleneiminecarbonate, morpholinium morpholinecarbonate, benzylammonium benzylcarbonate, triethoxysilylpropylammonium triethoxysilylpropylcarbonate, triethylenediaminium isopropylcarbonate and a derivative thereof, and the ammonium bicarbonate-based compound represented by the formula 4 is one or a mixture of two or more selected from the group consisting of isopropylammonium bicarbonate, t-butylammonium bicarbonate, 2-ethylhexylammonium bicarbonate, 2-methoxyethylammonium bicarbonate, 2-cyanoethylammonium bicarbonate, dioctadecylammonium bicarbonate, pyridinium bicarbonate, triethylenediaminium bicarbonate and a derivative thereof.

3. A method for preparing resin compositions containing uniformly dispersed nano silver particles having uniform sizes and high dispersibility, comprising: directly dissolving a silver complex prepared by reacting a silver compound represented by the formula 1 below with one or a mixture of two or more selected from the group consisting of ammonium carbamate-based compound, ammonium carbonate-based compound and ammonium bicarbonate-based compound represented by the formula 2 to 4, in a vinyl monomer in the absence of a polar solvent and a dispersing agent; radically polymerizing the vinyl monomer in the presence of a radical polymerization initiator; carrying out decomposition of the silver complex and reduction of silver ion to form nano silver particles during the radical polymerization; and removing volatile decomposed product by heating the obtained resin after completion of the radical polymerization, wherein the radical polymerization initiator is selected from the group consisting of α,α'-azobisisobutyronitrile (AIBN), dibenzoylperoxide, tertiarybutylperoxybenzoate, ditertiarybutylperoxide, tertiarybutylperoxy 2-ethylhexanoate, tertiarybutylperoxyacetate, cumylhydroperoxide, dicumylperoxide and tertiarybutylhydroperoxide, wherein the vinyl monomer is one or a mixture of two or more selected from the group consisting of methylacrylate, methylmethacrylate, ethylacrylate, ethylmethacrylate, propylacrylate, propylmethacrylate, butylacrylate, butylmethacrylate, hexylacrylate, hexylmethacrylate, octylacrylate, 2-ethylhexylacrylate, hydroxyethylacrylate, hydroxyethylmethacrylate, hydroxypropylacrylate, hydroxypropylmethacrylate, hydroxybutylacrylate, hydroxybutylmethacrylate, hydroxyhexylacrylate, hydroxyhexylmethacrylate, N,N-dimethylacrylamide, N,N-dimethylmethacrylamide; methoxyethylacrylate, methoxyethylmethacrylate, ethoxyethylacrylate, ethoxyethylmethcrylate, vinylchloride, vinylidene chloride, vinylfluoride, vinylidene fluoride, vinylacetate, vinylpropionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxamides, styrene, α-methylstyrene, N-vinylcaprolactam, acrylonitrile, methacrylonitrile, glycidylacrylate, glycidylmethacrylate, ethyleneglycolacrylate, ethyleneglycolmethacrylate, propyleneglycolacrylate, propyleneglycolmethacrylate, methoxyethyleneglycolacrylate, methoxyethyleneglycolmethacrylate, methoxypropyleneglycolacrylate, methoxypropyleneglycolmethacrylate, tetrahydrofurfuryl acrylate, tetrahydrofurfuryl methacrylate, 2-methoxyethyl acrylate, isoprene, butadiene, isobutylene and vinyl ether, diallylphthalate and diallylcarbonate,

[Formula 1]

$Ag_nX$

[Formula 2]

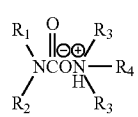

[Formula 3]

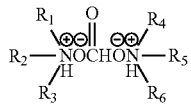

[Formula 4]

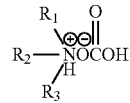

wherein, in the formula 1, X is a substituent selected from the group consisting of oxygen, sulfur, halogen, cyano, cyanate, carbonate, nitrate, nitrite, sulfate, phosphate, thiocyanate, chlorate, perchlorate, tetrafluoroborate, acetylacetonate, carboxylate and derivatives thereof, n is an integer from 1 to 4, the ammonium carbamate-based compound of the formula 2 is one or a mixture of two or more selected from the group consisting of ethylammonium ethylcarbamate, isopropylammonium isopropylcarbamate, n-butylammonium n-butylcarbamate, isobutylammonium isobutylcarbamate, t-butylammonium t-butylcarbamate, 2-ethylhexylammonium 2-ethylhexylcarbamate, octadecylammonium octadecylcarbamate, 2-methoxyethylammonium 2-methoxyethylcarbamate, 2-cyanoethylammonium 2-cyanoethylcarbamate, dibutylammonium dibutylcarbamate, dioctadecylammonium dioctadecylcarbamate, methyldecylammonium methyldecylcarbamate, hexamethyleneiminium hexamethyleneiminecarbamate, morpholinium morpholinecarbamate, pyridinium ethylhexylcarbamate, triethylenediaminium isopropylbicarbamate, benzylammonium benzylcarbamate, triethoxysilylpropylammonium triethoxysilylpropylcarbamate and a derivative thereof, the ammonium carbonate-based compound represented by the formula 3 is one or a mixture of two or more selected from the group consisting of ethylammonium ethylcarbonate, isopropylammonium isopropylcarbonate, n-butylammonium n-butylcarbonate, isobutylammonium isobutylcarbonate, t-butylammonium t-butylcarbonate, 2-ethylhexylammonium 2-ethylhexylcarbonate, 2-methoxyethylammonium 2-methoxyethylcarbonate, 2-cyanoethylammonium 2-cyanoethylcarbonate, octadecylammonium octadecylcarbonate, dibutylammonium dibutylcarbonate, dioctadecylammonium dioctadedylcarbonate, methyldecylammonium methyldecylcarbonate, hexamethyleneiminium hexamethyleneiminecarbonate, morpholinium morpholinecarbonate, benzylammonium benzylcarbonate, triethoxysilylpropylammonium triethoxysilylpropylcarbonate, triethylenediaminium isopropylcarbonate and a derivative thereof, and the ammonium bicarbonate-based compound represented by the formula 4 is one or a mixture of two or more selected from the group consisting of isopropylammonium bicarbonate, t-butylammonium bicarbonate, 2-ethylhexylammonium bicarbonate, 2-methoxyethylammonium bicarbonate, 2-cyanoethylammonium bicarbonate, dioctadecylammonium bicarbonate, pyridinium bicarbonate, triethylenediaminium bicarbonate and a derivative thereof.

4. A method for preparing resin compositions containing uniformly dispersed nano silver particles having uniform sizes and high dispersibility, comprising: directly dissolving a silver complex prepared by reacting a silver compound represented by the formula 1 below with one or a mixture of two or more selected from the group consisting of ammonium carbamate-based compound, ammonium carbonate-based compound and ammonium bicarbonate-based compound represented by the formula 2 to 4, in a vinyl monomer in the absence of a polar solvent and a dispersing agent; radically polymerizing the vinyl monomer in the presence of a radical polymerization initiator; and removing volatile decomposed product and carrying out decomposition of the silver complex and reduction of silver ion to form nano silver particles by heating the obtained resin after completion of the radical polymerization, wherein the radical polymerization initiator is selected from the group consisting of α,α'-azobisisobutyronitrile (AIBN), dibenzoylperoxide, tertiarybutylperoxybenzoate, ditertiarybutylperoxide, tertiarybutylperoxy 2-ethylhexanoate, tertiarybutylperoxyacetate, cumylhydroperoxide, dicumylperoxide and tertiarybutylhydroperoxide, wherein the vinyl monomer is one or a mixture of two or more selected from the group consisting of alkyl group-containing vinyl monomer, hydroxyl group-containing vinyl monomer, N-substituted amide-based vinyl monomer, alkoxyalkylacrylate-based vinyl monomer, cyanoacrylate monomer, epoxy group-containing acrylic monomer, acrylic acid ester monomer,

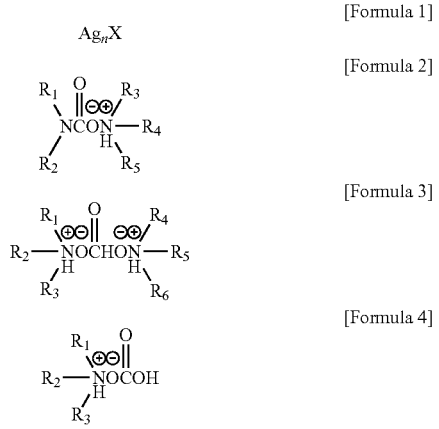

[Formula 1]

[Formula 2]

[Formula 3]

[Formula 4]

wherein, the silver compound represented by the formula 1 is one or a mixture of two or more selected from the group consisting of silver oxide, silver thiocyanate, silver cyanide, silver cyanate, silver carbonate, silver nitrate, silver nitrite, silver sulfate, silver phosphate, silver perchlorate, silver tetrafluoroborate, silver acetylacetonate, silver acetate, silver lactate, silver oxalate and a derivative thereof, the ammonium carbamate-based compound of the formula 2 is one or a mixture of two or more selected from the group consisting of ethylammonium ethylcarbamate, isopropylammonium isopropylcarbamate, n-butylammonium n-butylcarbamate, isobutylammonium isobutylcarbamate, t-butylammonium t-butylcarbamate, 2-ethylhexylammonium 2-ethylhexylcarbamate, octadecylammonium octadecylcarbamate, 2-methoxyethylammonium 2-methoxyethylcarbamate, 2-cyanoethylammonium 2-cyanoethylcarbamate, dibutylammonium dibutylcarbamate, dioctadecylammonium dioctadecylcarbamate, methyldecylammonium methyldecylcarbamate, hexamethyleneiminium hexamethyleneiminecarbamate, morpholinium morpholinecarbamate, pyridinium ethylhexylcarbamate, triethylenediaminium isopropylbicarbamate, benzylammonium benzylcarbamate, triethoxysilylpropylammonium triethoxysilylpropylcarbamate and a derivative thereof, the ammonium carbonate-based compound represented by the formula 3 is one or a mixture of two or more selected from the group consisting of ethylammonium ethylcarbonate, isopropylammonium isopropylcarbonate, n-butylammonium n-butylcarbonate, isobutylammonium isobutylcarbonate, t-butylammonium t-butylcarbonate, 2-ethylhexylammonium 2-ethylhexylcarbonate, 2-methoxyethylammonium 2-methoxyethylcarbonate, 2-cyanoethylammonium 2-cyanoethylcarbonate, octadecylammonium octadecylcarbonate, dibutylammonium dibutylcarbonate, dioctadecylammonium dioctadecylcarbonate, methyldecylammonium methyldecylcarbonate, hexamethyleneiminium hexamethyleneiminecarbonate, morpholinium morpholinecarbonate, benzylammonium benzylcarbonate, triethoxysilylpropylammonium triethoxysilylpropylcarbonate, triethylenediaminium isopropylcarbonate and a derivative thereof, and the ammonium bicarbonate-based compound represented by the formula 4 is one or a mixture of two or more selected from the group consisting of isopropylammonium bicarbonate, t-butylammonium bicarbonate, 2-ethylhexylammonium bicarbonate, 2-methoxyethylammonium bicarbonate, 2-cyanoethylammonium bicarbonate, dioctadecylammonium bicarbonate, pyridinium bicarbonate, triethylenediaminium bicarbonate and a derivative thereof.

5. A method for preparing resin compositions containing uniformly dispersed nano silver particles having uniform sizes and high dispersibility, comprising: directly dissolving a silver complex prepared by reacting a silver compound represented by the formula 1 below with one or a mixture of two or more selected from the group consisting of ammonium carbamate-based compound, ammonium carbonate-based compound and ammonium bicarbonate-based compound represented by the formula 2 to 4, in a vinyl monomer in the absence of a polar solvent and a dispersing agent; radically polymerizing the vinyl monomer in the presence of a radical polymerization initiator; and carrying out decomposition of the silver complex and reduction of silver ion to form nano silver particles by heating the obtained resin after completion of the radical polymerization, wherein the radical polymerization initiator is selected from the group consisting of α,α'-azobisisobutyronitrile (AIBN), dibenzoylperoxide, tertiarybutylperoxybenzoate, ditertiarybutylperoxide, tertiarybutylperoxy 2-ethylhexanoate, tertiarybutylperoxyacetate, cumylhydroperoxide, dicumylperoxide and tertiarybutylhydroperoxide, wherein the vinyl monomer is one or a mixture of two or more selected from the group consisting of alkyl group-containing vinyl monomer, hydroxyl group-containing vinyl monomer, N-substituted amide-based vinyl monomer, alkoxyalkylacrylate-based vinyl monomer, cyanoacrylate monomer, epoxy group-containing acrylic monomer, acrylic acid ester monomer,

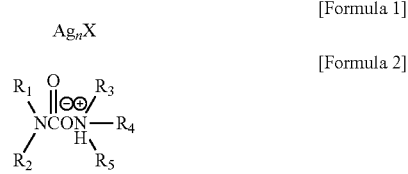

[Formula 1]

[Formula 2]

-continued

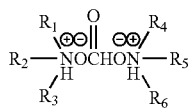
[Formula 3]

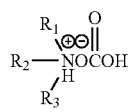
[Formula 4]

wherein, the silver compound represented by the formula 1 is one or a mixture of two or more selected from the group consisting of silver oxide, silver thiocyanate, silver cyanide, silver cyanate, silver carbonate, silver nitrate, silver nitrite, silver sulfate, silver phosphate, silver perchlorate, silver tetrafluoroborate, silver acetylacetonate, silver acetate, silver lactate, silver oxalate and a derivative thereof, the ammonium carbamate-based compound of the formula 2 is one or a mixture of two or more selected from the group consisting of ethylammonium ethylcarbamate, isopropylammonium isopropylcarbamate, n-butylammonium n-butylcarbamate, isobutylammonium isobutylcarbamate, t-butylammonium t-butylcarbamate, 2-ethylhexylammonium 2-ethylhexylcarbamate, octadecylammonium octadecylcarbamate, 2-methoxyethylammonium 2-methoxyethylcarbamate, 2-cyanoethylammonium 2-cyanoethylammonium dibutylammonium dibutylcarbamate, dioctadecylammonium dioctadecylcarbamate, methyldecylammonium methyldecylcarbamate, hexamethyleneiminium hexamethyleneiminecarbamate, morpholinium morpholinecarbamate, pyridinium ethylhexylcarbamate, triethylenediaminium isopropylbicarbamate, benzylammonium benzylcarbamate, triethoxysilylpropylammonium triethoxysilylpropylcarbamate and a derivative thereof, the ammonium carbonate-based compound represented by the formula 3 is one or a mixture of two or more selected from the group consisting of ethylammonium ethylcarbonate, isopropylammonium isopropylcarbonate, n-butylammonium n-butylcarbonate, isobutylammonium isobutylcarbonate, t-butylammonium t-butylcarbonate, 2-ethylhexylammonium 2-ethylhexylcarbonate, 2-methoxyethylainmonium, 2-methoxyethylcarbonate, 2-cyanoethylammonium, 2-cyanoethylcarbonate, octadecylammonium octadecylcarbonate, dibutylammonium dibutylcarbonate, dioctadecylammonium dioctadecylcarbonate, methyldecylammonium methyldecylcarbonate, hexamethyleneiminium hexamethyleneiminecarbonate, morpholinium morpholinecarbonate, benzylammonium benzylcarbonate, triethoxysilylpropylammonium triethoxysilylpropylcarbonate, triethylenediaminium isopropylcarbonate and a derivative thereof, and the ammonium bicarbonate-based compound represented by the formula 4 is one or a mixture of two or more selected from the group consisting of isopropylammonium bicarbonate, t-butylammonium bicarbonate, 2-ethylhexylammonium bicarbonate, 2-methoxyethylammonium bicarbonate, 2-cyanoethylammonium bicarbonate, dioctadecylammonium bicarbonate, pyridinium bicarbonate, triethylenediaminium bicarbonate and a derivative thereof.

* * * * *

UNITED STATES PATENT AND TRADEMARK OFFICE
CERTIFICATE OF CORRECTION

| | |
|---|---|
| PATENT NO. | : 9,096,737 B2 |
| APPLICATION NO. | : 14/032417 |
| DATED | : August 4, 2015 |
| INVENTOR(S) | : Myoung Seon Gong et al. |

It is certified that error appears in the above-identified patent and that said Letters Patent is hereby corrected as shown below:

In the Claims

Column 15, Line 13, Claim 1, delete "methoxyetylcarbonate," and insert -- methoxyethylcarbonate, --

Column 18, Line 46, Claim 3, delete "dioctadedylcarbonate," and insert -- dioctadecylcarbonate, --

Column 21, Line 29, Claim 5, delete "2-cyanoethylammonium" and insert -- cyanoethylcarbamate, --

Column 22, Line 13, Claim 5, delete "methoxyethylainmonium," and insert -- methoxyethylammonium, --

Column 22, Lines 14-15, Claim 5, delete "2-cyanoethylammonium," and insert -- 2-cyanoethylammonium --

Signed and Sealed this
Twenty-first Day of June, 2016

Michelle K. Lee
*Director of the United States Patent and Trademark Office*